March 28, 1933.  R. G. CARLSON  1,903,028
EXTERNALLY SUSPENDED GLAND STUD
Filed Aug. 5, 1931   2 Sheets-Sheet 1
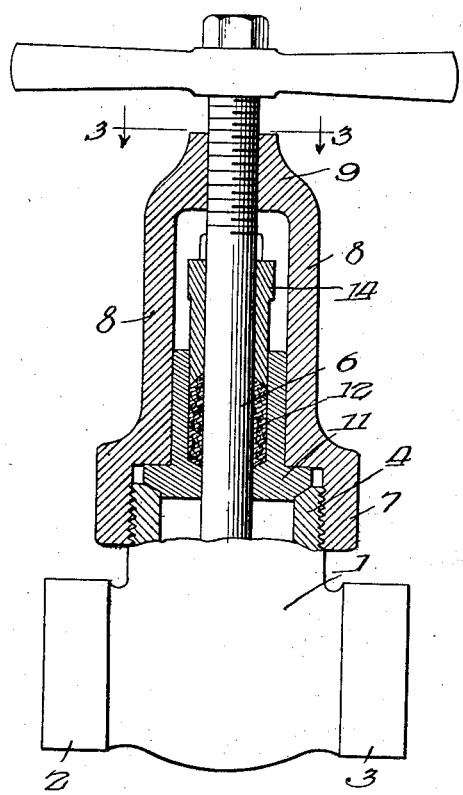
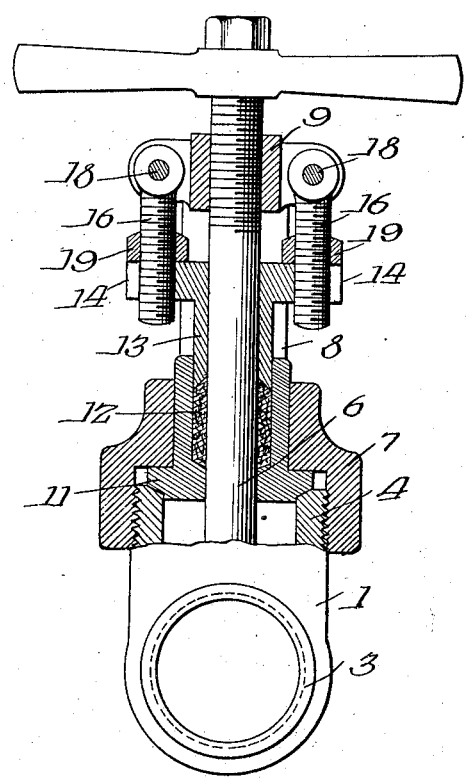
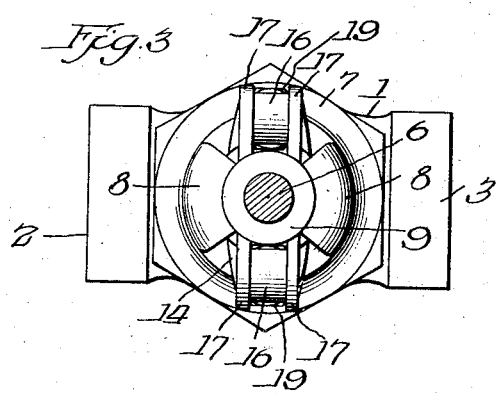
Inventor:
Ralph G. Carlson.
By: Wilson, Oswell, McKenna & Rehm
Attys

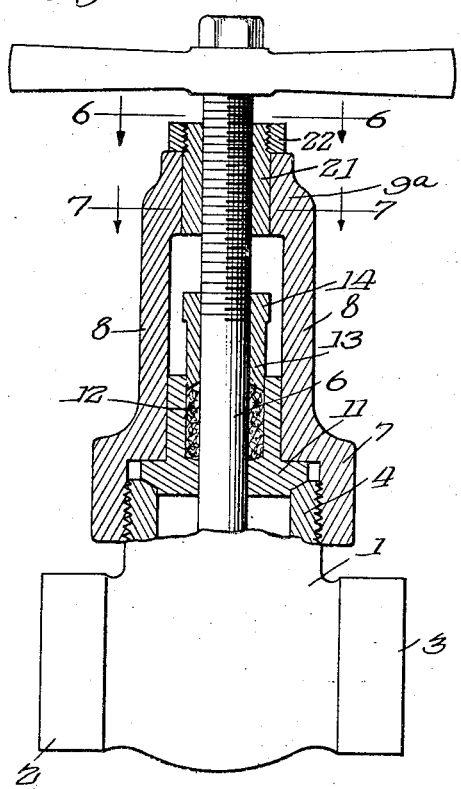
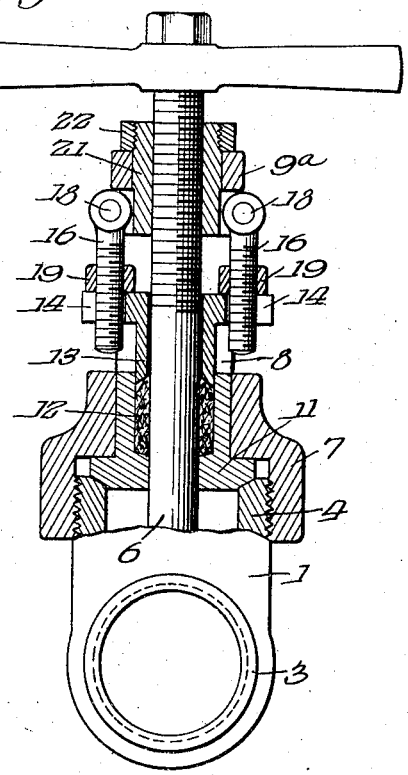
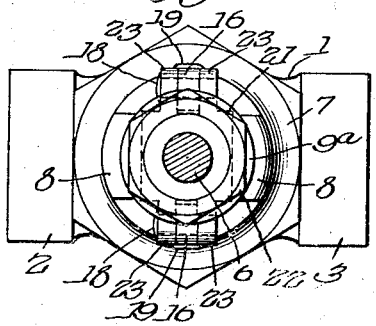
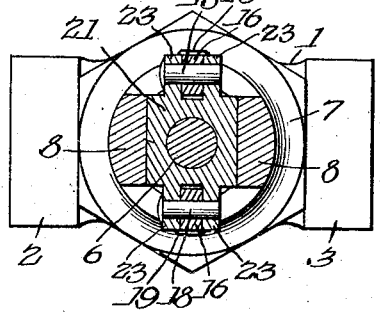

Patented Mar. 28, 1933

1,903,028

UNITED STATES PATENT OFFICE

RALPH G. CARLSON, OF CHICAGO, ILLINOIS, ASSIGNOR TO CRANE CO., OF CHICAGO, ILLINOIS, A CORPORATION OF ILLINOIS

EXTERNALLY SUSPENDED GLAND STUD

Application filed August 5, 1931. Serial No. 555,271.

This invention relates to valves and more particularly to means thereon for forcing the packing gland into the stuffing box to compress the packing therein.

In the present valve construction it is customary to anchor the usual studs, employed to draw the packing gland down into the stuffing box, at their lower ends in the valve body or bonnet. This arrangement requires that the studs be disposed at quite a distance from the center of the valve stem because the studs must clear the outer wall of the stuffing box. Accordingly in this form pressure is applied to the packing gland at points distant from the center of the gland. Furthermore the studs are inconveniently placed for adjusting the packing gland and are also in the way when it is necessary to repack the stuffing box.

It is the purpose of this invention to provide means whereby the packing gland may be positively and conveniently forced into the stuffing box by pressure applying means located near the center of the gland, which means is removable to a position out of the way and which may also be used to support the gland in its uppermost position while the stuffing box is being repacked. It is a further purpose of this invention to provide such a means which may be cheaply manufactured and is independent of the other valve structure, that is, it may be applied to various of the accepted valve structures.

A better understanding of this invention will be had from the following description given in connection with the drawings, in which:

Fig. 1 is a vertical transverse section of one type of valve embodying the principles of this invention;

Fig. 2 is a similar section taken on a plane at right angles to the plane of Fig. 1;

Fig. 3 is a section on line 3—3 of Fig. 1;

Fig. 4 is a vertical transverse section of a modified type of valve embodying the principles of this invention;

Fig. 5 is a similar section taken on a plane at right angles to the plane of Fig. 4;

Fig. 6 is a transverse section taken on line 6—6 of Fig 4; and

Fig. 7 is a transverse section taken on line 7—7 of Fig. 4.

Referring more particularly to the drawings and especially to Figs. 1, 2 and 3 which it will be understood illustrate merely one form of a valve embodying the principles of this invention, it will be seen that the valve comprises a body 1 having a pair of connecting ends 2 and 3 and an upper bonnet or yoke connection 4 through which the valve stem 6 projects. In the present illustration the upper opening 4 is threaded externally to receive the lower end of a yoke or bonnet 7 which extends upwardly into a pair of diametrically opposite yoke arms 8 which terminate in a yoke hub 9 threaded internally to engage a similarly threaded portion of the valve stem.

A removable swivel stuffing box 11 is illustrated, the latter being held in position by the union joint of the bonnet or yoke. The stuffing box is bored to receive packing 12 in the usual manner which is compressed by a gland 13 having a flanged end 14 slotted at its terminating ends. The gland is arranged to be positively forced into position by a pair of eye studs 16 which pass through the slotted ends of the gland. The studs are swivelled at their upper ends and above the gland between two pairs of ears 17 projecting laterally from hub 9. A pair of pins 18 spanning the ears 17 serve as the pivots for the eye bolts. A pair of nuts 19 threaded upon the eye bolts force the gland downwardly into the stuffing box.

It follows from the foregoing construction that by running nuts 19 downwardly upon studs 16, gland 13 will be forced into the stuffing box. When the gland is in its lowermost position, studs 16 may be swung outwardly upon their pivots to horizontal or vertical position to carry them completely out of the way. If desired, one stud may be left in downward position and the nut placed upon the other side of the gland to hold the gland upwardly and out of the way while the stuffing box is being repacked.

Referring to Figs. 4 to 7 inclusive, a slightly modified form of valve is illustrated which is more practical for the larger sized valves.

In larger sized valves it is desirable to use a stem bushing rather than thread the stem through a yoke hub. In this form of valve a stem bushing 21 is employed which is secured within the hub 9a of the yoke by nut 22. The stem bushing is provided at diametrically opposite points with pairs of opposed ears 23 through which the pin 18 is passed and upon which the eye bolts 16 are swivelled. In all other respects the construction is identical to that described in connection with the embodiment of this invention shown in Figs. 1 to 3. The eye bolts 16 and nuts 19 are utilized in a similar manner to force the gland into the stuffing box to compress packing.

The foregoing construction utilized in the form of a valve shown in Figs. 4 to 6 is employed in order that the thrust upon the gland may be made at points as near as possible to the axis of movement of the gland, that is, as near as possible to the center of the gland. It will be apparent that by forming the ears 23 upon the stem bushing the pivotal point of the eye bolts is much nearer the center or axis of the gland than would be the case if the ears were formed upon the yoke hub which must necessarily be enlarged to receive the removable stem bushing.

By the foregoing arrangement the studs may be disposed very close to the valve stem inasmuch as they do not have to clear the outer side of the stuffing box as they would if they were anchored below the gland. By arranging the studs close to the valve stem, pressure can be exerted on the gland close to the axis thereof and accordingly a more direct application of power is available. The studs are also placed under a compression rather than a tension and accordingly insures greater application of pressure upon the gland. By swivelling the studs above the packing gland, the gland compressing means, namely the studs, is entirely independent of the construction around the lower end of the yoke, bonnet or stuffing box. From the manufacturing standpoint the foregoing arrangement of pivoting the gland studs is much cheaper than tapping the body or other parts of the valve to anchor the studs therein at points below the gland.

It will be apparent to those skilled in the art that many variations may be indulged in, in the details of construction without departing from the spirit and scope of this invention as defined in the following claims.

I claim:

1. In a valve structure, a body having a valve stem extending therethrough surrounded by a stuffing box, a packing gland arranged to compress the packing around said stem, a yoke extending from said body, a removable stem bushing secured to said yoke, and means pivoted to said bushing and arranged to force the gland into said stuffing box, said means being movable about said pivot into retracted position out of the path of said gland.

2. In a valve structure, a body having a valve stem extending therethrough surrounded by a stuffing box, a packing gland arranged to compress the packing around said stem, a yoke extending from said body, a removable stem bushing secured to said yoke above said box, a pair of studs pivoted to said bushing and means thereon arranged to force the gland into said stuffing box.

In witness of the foregoing I affix my signature.

RALPH G. CARLSON.